United States Patent
Webber et al.

(10) Patent No.: US 6,468,456 B1
(45) Date of Patent: Oct. 22, 2002

(54) METHOD OF CREATING A LOCATING OR LOAD BEARING SURFACE

(75) Inventors: Dominic George Webber, Herts; Julian Perry, Lincs, both of (GB)

(73) Assignee: Fujifilm Electronic Imaging LTD, Herts (GB)

( * ) Notice: Subject to any disclaimer, the term of this patent is extended or adjusted under 35 U.S.C. 154(b) by 0 days.

(21) Appl. No.: 09/491,528

(22) Filed: Jan. 26, 2000

(30) Foreign Application Priority Data

Jan. 28, 1999 (EP) ............................................. 99300631

(51) Int. Cl.⁷ .............................................. B29C 39/10
(52) U.S. Cl. ....................... 264/219; 29/527.1; 264/254; 264/299
(58) Field of Search ................................. 264/219, 299, 264/313, 338, 251, 254, 260, 264, 35; 29/898.02, 898.03, 527.2, 559, 530, 527.1

(56) References Cited

U.S. PATENT DOCUMENTS

| | | | |
|---|---|---|---|
| 3,933,962 A | * | 1/1976 | Meier .......................... 264/256 |
| 4,726,103 A | | 2/1988 | Knight et al. .............. 29/281.5 |
| 4,863,149 A | * | 9/1989 | Luther et al. |
| 4,877,326 A | * | 10/1989 | Chadwick et al. |
| 4,889,676 A | * | 12/1989 | Rosenberg et al. ......... 264/255 |
| 4,907,478 A | * | 3/1990 | Brown et al. |
| 5,488,771 A | * | 2/1996 | Devitt et al. .............. 29/898.02 |
| 5,572,598 A | * | 11/1996 | Wihl et al. |
| 5,788,379 A | * | 8/1998 | Reeve |
| 6,150,740 A | * | 11/2000 | Slocum |

FOREIGN PATENT DOCUMENTS

| | | |
|---|---|---|
| DE | 29 13 254 B1 | 8/1980 |
| EP | 0 768 161 A1 | 4/1997 |
| EP | 0 787 569 A2 | 8/1997 |

OTHER PUBLICATIONS

Patent Abstracts of Japan, Publication No. 55030951, Mar. 5, 1980 (JP 53104428, Aug. 29, 1978).
Patent Abstracts of Japan, Publication No. 10131325, May 19, 1998 (JP 08292488, Nov. 5, 1996).
Patent Abstracts of Japan, Publication No. 03075702, Mar. 29, 1991 (JP 01212488, Aug. 18, 1989).

* cited by examiner

Primary Examiner—Jill L. Heitbrink
(74) Attorney, Agent, or Firm—Sughrue Mion, PLLC

(57) ABSTRACT

A method of creating a locating or load bearing surface having a desired flatness or profile. The method comprises:
 a) providing a base on which the surface is to be created;
 b) locating a moulding member having a master surface with the desired flatness or profile facing and spaced from the base;
 c) supplying a curable material to a region between the base and the master surface whereby the curable material contacts both the base and the master surface;
 d) curing the curable material; and,
 e) removing the moulding member so as to leave the surface having the desired flatness or profile provided on the exposed surface of the cured material.

11 Claims, 3 Drawing Sheets

METHOD OF CREATING A LOCATING OR LOAD BEARING SURFACE

FIELD OF THE INVENTION

The invention relates to a method of creating a locating or load bearing surface having a desired flatness or profile.

DESCRIPTION OF THE PRIOR ART

Flat locating surfaces are required for a number of applications such as supporting guide ways for machine tools and for an optical scanning carriage in imagesetting machines. Conventionally, such a surface is obtained by precision machining a surface to the required level of flatness. The problem with this conventional approach is that for relatively long surfaces, for example 1.5 metres or more, the support member can bow for a number of reasons including temperature gradients, stress relief and machine tool errors.

U.S. Pat. No. 4,726,103 illustrates the use of an epoxy injection technique for locating guide ways in a predetermined relationship to each other on a bed of a machine tool. In this case, the guide ways are supported above the bed in precise locations and a bonding material is injected between the guide ways and the bed which then bonds the guide ways to the bed in their precise locations. This does not overcome the problems mentioned above since the load bearing surfaces would still need to have been machined to the desired degree of flatness, and the required degree of flatness or profile cannot be repeated precisely, using that technique.

SUMMARY OF THE INVENTION

In accordance with the present invention, a method of creating a locating or load bearing surface having a desired flatness or profile comprises
a) providing a base on which the surface is to be created;
b) locating a moulding member having a master surface with the desired flatness or profile facing and spaced from the base;
c) supplying a curable material to a region between the base and the master surface whereby the curable material contacts both the base and the master surface;
d) curing the curable material; and,
e) removing the moulding member so as to leave the surface having the desired flatness or profile provided on the exposed surface of the cured material.

With this invention, it is only necessary to use a known technique such as precision machining or hand finishing to obtain the desired flatness or profile on the master surface and thereafter that master surface can be used repeatedly to create corresponding surfaces on subsequent structures. It is therefore not necessary to use a conventional machining technique on each occasion on which a flat surface is required.

In some cases, the curable material will have sufficient viscosity to be retained between the master surface and the base prior to curing. An example of a suitable material is an epoxy.

Conveniently, however, the method further comprises providing a curable material confining wall around at least part of the said region. This could be defined by a wall of a recess provided in the base or alternatively the wall is made of a flexible material. This material would be provided on the base and is flexible so as not to affect the flatness or profile of the moulding member and thus the resultant locating or load bearing surface. There are various types of sealant which are suitable such as Tesomol, Poron, and rubber.

The base may have an elongate form and the curable material may be provided throughout the length of the base. In some applications, however, the base will have one or more upstanding bosses and in these cases the curable material will be provided on the bosses only.

In order to separate the master surface from the cured material in step e), the master surface may be treated to have the necessary release properties but conveniently the master surface is coated with a suitable release material. An example is Diamant Separator.

The moulding member may have any convenient form and may be in the form of a bar with a solid or box section.

The master surface will generally be flat but in some cases could have a profiled e.g. curved form. The precise form could be controlled by providing one or more micrometer adjusters along the moulding member. This would avoid the need for a high level of precision machining.

As mentioned previously, the invention has a number of applications but a particularly important application is in the construction of a guideway system for an optics carriage in an image setter, the method comprising creating a pair of substantially parallel, laterally spaced, elongate locating or load bearing surfaces using a method according to the invention.

BRIEF DESCRIPTION OF THE DRAWINGS

An example of a method according to the invention will now be described with reference to the accompanying drawings, in which.

DETAILED DESCRIPTION OF THE EMBODIMENT

Figure 1:
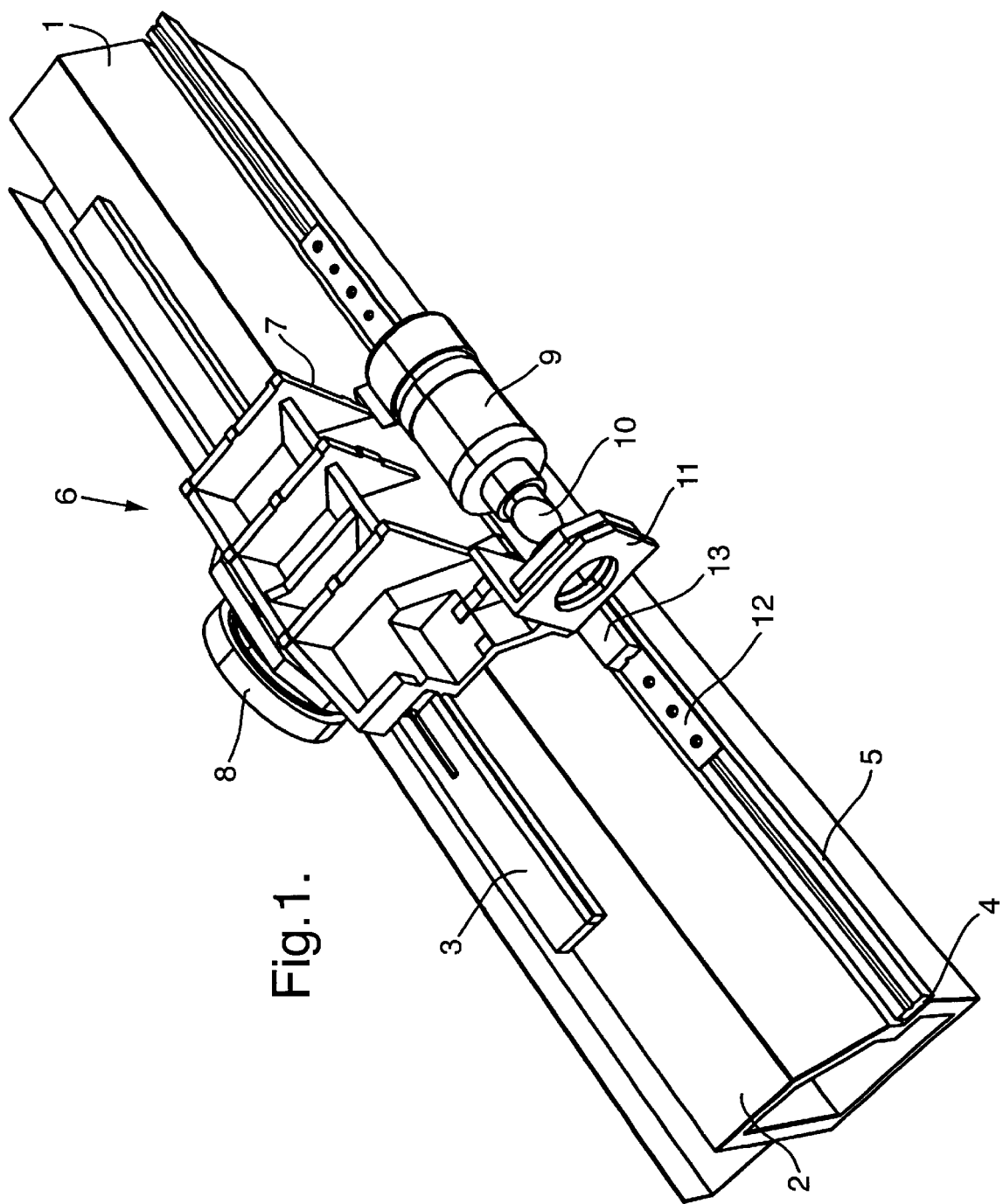
FIG. 1 is a perspective view from above of the carriage and traverse assembly of an internal drum image setter.
Figure 2:
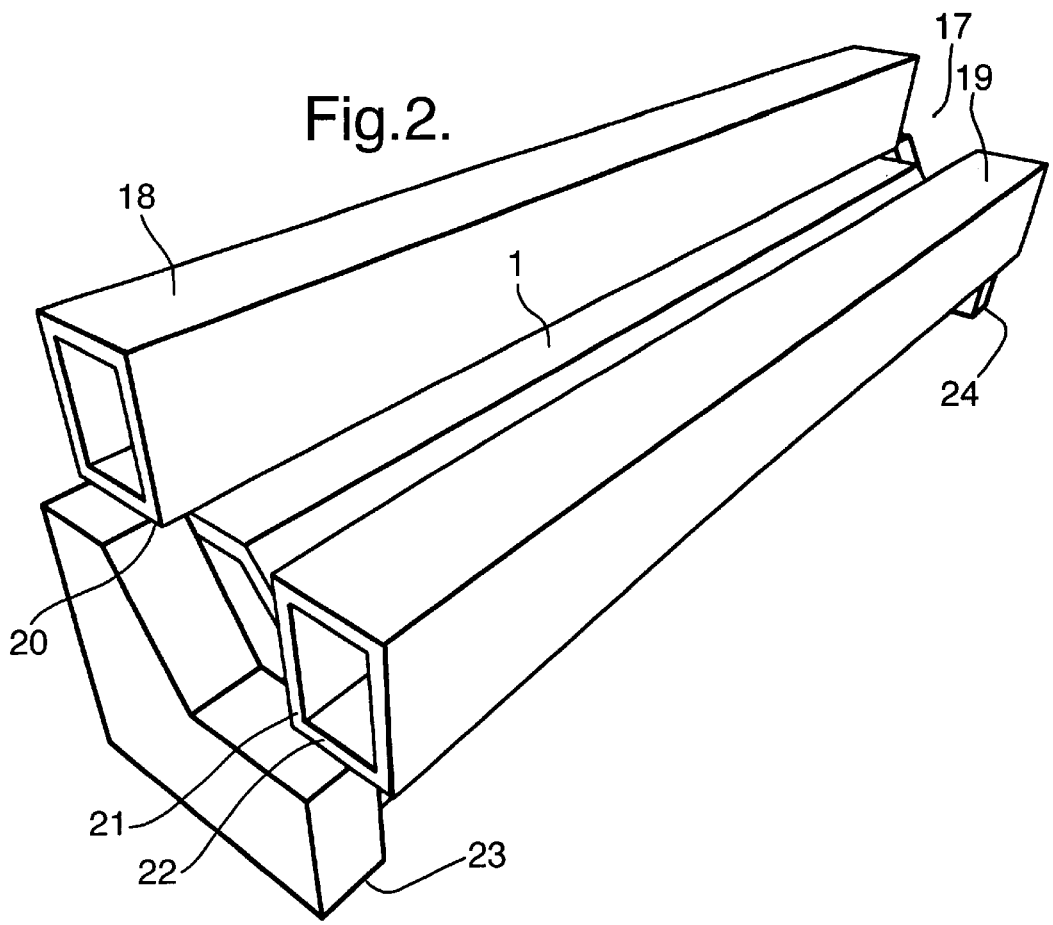
FIG. 2 is a partial perspective view showing part of an example of the tooling required for creating flat surfaces on the beam of FIG. 1.
Figure 3:
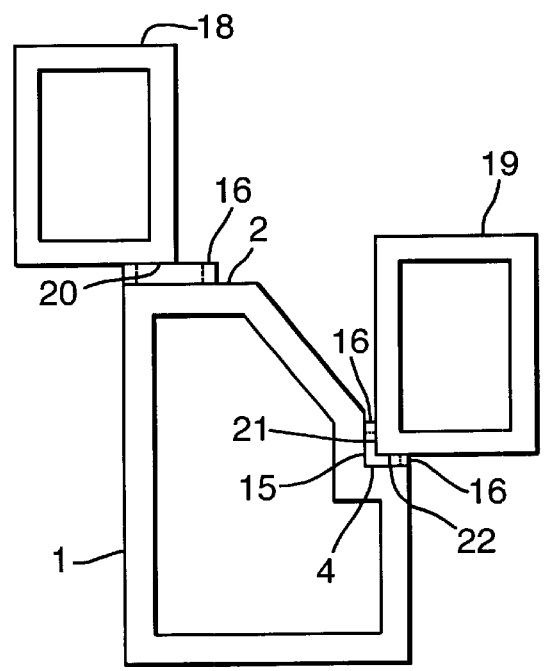
FIG. 3 is a schematic, side view (not to scale) of part of the assembly shown in FIG. 2.

The spinner carriage and traverse assembly, shown in FIGS. 1 to 3, comprises an aluminium base structure 1 which provides location faces 2,4,15 for linear bearings 3,5—a flat rail and V-guide respectively. An optics carriage assembly 6 is supported on a rail bearing 13 and ball cage 12, which itself is supported by the V-guide linear bearing 5. The optics carriage assembly 6 comprises a carriage casting 7 to which is attached a drive motor assembly 8 and a spinner 9 which rotates a mirror 10 causing a laser beam passing through a focusing lens 11 (supported on the carriage 7) to be scanned across a record medium (not shown) within a drum in which the assembly is mounted.

It will be realised that location faces 2,4,15 are provided very accurately and to a high precision flatness or profile specification, ensuring that once bearing components 3,5 are fixed in position upon them, the optics carriage assembly can travel in the axis of scan with the minimum horizontal and vertical displacement. The rail 3 and V-guides 5 are fixed to faces 2,4,15 which may be continuous surfaces (as shown) or a series of bosses depending upon manufacturing preferences. These faces are conventionally machined to a high precision flatness or profile (for example a variation of no more than 10 μm in 1.5 m), but this technique is both time consuming and the results following each machining are subject to variation. The present invention overcomes these problems.

Figure 4:
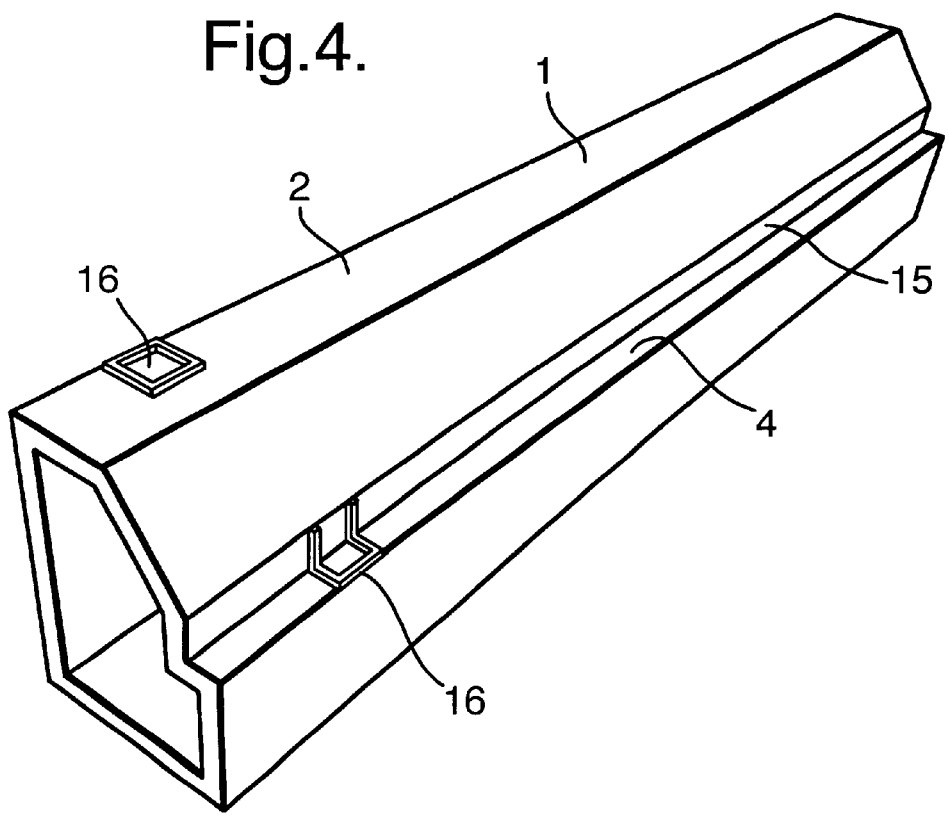
FIG. 4 is a perspective view the beam casting shown in FIG. 3 with a pair of moulding regions; and, FIG. 5 is a perspective view (not to scale) of the part of the beam casting shown in FIG. 4 after moulding.

In the present case, a number of moulded epoxy regions are provided on the faces 2,4,15 of the base 1. In this example, each region is defined by a wall of a flexible sealant material 16 (two of which are shown in FIG. 4) which are adhered to the beam 1. The wall 16 on the face 2 is a closed square while the wall 16 on the face 4 extends up an adjacent face 15 and is open on one side.

Figure 5:
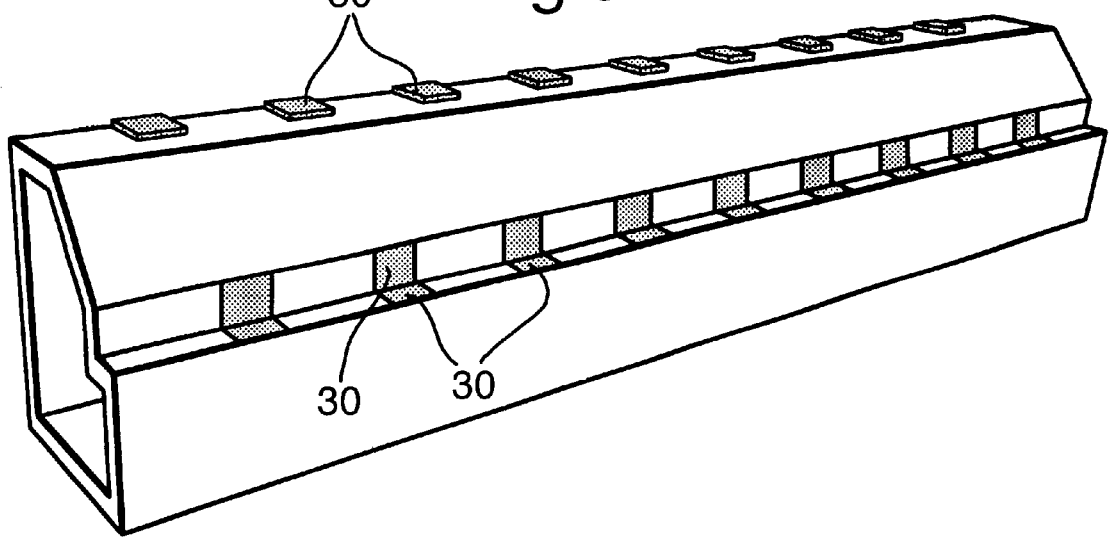

The beam 1 is then brought up to a jig 17 which comprises a pair of moulding members 18,19 having surfaces 20,21,22 precision machined to the desired flatness or profile. The surfaces 20,21,22 are coated with a suitable release agent. The moulding members 18,19 are supported using supports 23,24. The beam casting faces 2,4,15 are positioned relative to the moulding members 18,19 to give the desired epoxy layer geometry and compression of the sealing walls 16. To provide fine adjustment, the beam 1 may be aligned relative to the moulding members 18,19 by the use of threaded adjusters (not shown) located on the jig or the beam support. The gap between the beam casting faces and the moulding members may be determined by the use of feeler gauges or other spacers to ensure uniform spacing along the beam length, or otherwise as required. A curable epoxy compound is then injected between each moulding member 18,19 and the respective faces 20,21,22 through the open sides of the walls 16 until the epoxy fills the cavity defined between the moulding members 18,19 and faces 20,21,22. The epoxy is then allowed to cure over a period of for example a day and then the jig 17 is retracted leaving a number of cured epoxy portions 30 adhered to the faces 2,4,15, each portion 30 of cured epoxy having an exposed surface which corresponds to the appropriate precision surface 20,21,22 of each moulding member, as shown in FIG. 5.

The walls 16 can then be removed or left in place and the flat rail 3 and V-guide 5 are then secured onto the cured surfaces in a conventional manner.

Any deposits on the surfaces 20,21 can be washed off leaving them ready for repeated use on subsequent base structures without the need for any further rework thereof.

We claim:

1. A method of constructing an imagesetter optics carriage guideway system having a pair of substantially flat, parallel, laterally spaced, elongate, locating or load bearing surfaces of a desired flatness or profile, the method comprising:
   a) providing a base on which the pair of locating or load bearing surfaces are to be created;
   b) locating one or more moulding members each having a master surface with the desired flatness or profile facing and spaced from the base;
   c) supplying a curable material to a region between the base and a respective master surface of the one or more moulding members whereby the curable material contacts both the base and a respective master surface;
   d) curing the curable material; and,
   e) removing the one or more moulding members so as to leave one or both of the pair of locating or load bearing surfaces having the desired flatness or profile provided on the exposed surface of the cured material, so as to define a pathway for movement of the carriage in the imagesetter optics carriage guideway system.

2. A method according to claim 1, wherein prior to step c), the method further comprises providing a curable material confining wall around at least part of the said region.

3. A method according to claim 2, wherein the wall is made of a flexible material.

4. A method according to claim 3, wherein the confining wall is made of a sealant.

5. A method according to claim 1, wherein the base has one or more bosses on which the curable material is provided.

6. A method according to claim 1, further comprising coating each master surface with a release material to enable it to be easily,separated from the cured materials.

7. A method according to claim 1, wherein each master surface has been formed by precision grinding.

8. A method according to claim 1, wherein the one or more moulding members providing each master surface is made of metal.

9. A method according to claim 1, wherein the one or more moulding members providing each master surface is defined by an elongate bar.

10. A method according to claim 1, wherein each master surface is a flat surface.

11. A method according to claim 1, further comprising providing a V-guide member and a friction drive rail respectively on the two elongate surfaces.

* * * * *